United States Patent
Ha et al.

(10) Patent No.: US 8,039,145 B2
(45) Date of Patent: Oct. 18, 2011

(54) SECONDARY BATTERY MODULE WITH EXPOSED UNIT CELLS AND INSULATION BETWEEN TERMINALS

(75) Inventors: Jin Woong Ha, Cheonan-si (KR); Jeeho Kim, Daejeon (KR); HanHo Lee, Daejeon (KR)

(73) Assignee: LG Chem, Ltd. (KR)

( * ) Notice: Subject to any disclaimer, the term of this patent is extended or adjusted under 35 U.S.C. 154(b) by 1265 days.

(21) Appl. No.: 11/314,506

(22) Filed: Dec. 21, 2005

(65) Prior Publication Data

US 2006/0177733 A1    Aug. 10, 2006

(30) Foreign Application Priority Data

Dec. 24, 2004 (KR) .................. 10-2004-0112589
Dec. 24, 2004 (KR) .................. 10-2004-0112596

(51) Int. Cl.
*H01M 2/00* (2006.01)
*H01M 2/20* (2006.01)

(52) U.S. Cl. ......... 429/163; 429/177; 429/178; 429/179

(58) Field of Classification Search ..................... None
See application file for complete search history.

(56) References Cited

U.S. PATENT DOCUMENTS

| | | | | |
|---|---|---|---|---|
| 5,283,137 A | * | 2/1994 | Ching | 429/175 |
| 5,298,347 A | * | 3/1994 | Aksoy et al. | 429/98 |
| 5,358,798 A | * | 10/1994 | Kleinert et al. | 429/7 |
| 5,441,824 A | * | 8/1995 | Rippel | 429/53 |
| 5,547,775 A | * | 8/1996 | Eguchi et al. | 320/118 |
| 5,592,094 A | * | 1/1997 | Ichikawa | 324/427 |
| 5,925,901 A | * | 7/1999 | Tsutsui | 257/276 |
| 6,296,967 B1 | * | 10/2001 | Jacobs et al. | 429/93 |
| 7,504,179 B2 | | 3/2009 | Tanjou et al. | |
| 2003/0071711 A1 | * | 4/2003 | Haupt et al. | 337/159 |
| 2003/0213121 A1 | | 11/2003 | Rouillard et al. | |
| 2005/0123828 A1 | * | 6/2005 | Oogami et al. | 429/152 |

FOREIGN PATENT DOCUMENTS

| | | |
|---|---|---|
| EP | 1156537 | 11/2001 |
| JP | 09219181 | 8/1997 |
| JP | 2003045492 | 2/2003 |

* cited by examiner

*Primary Examiner* — Raymond Alejandro
*Assistant Examiner* — Kwang Han
(74) *Attorney, Agent, or Firm* — Cantor Colburn LLP

(57) ABSTRACT

Disclosed herein is a high-output, large-capacity secondary battery module, having a plurality of unit cells electrically connected to each other, for charging and discharging electricity. A plurality of unit cells are stacked one on another and mounted on a plate, preferably, between an upper case and a lower case, which are separated from each other, circuit units are continuously mounted at the side surfaces of the module for sensing the voltage, the current, and the temperature of the battery, controlling the battery, and interrupting electricity when overcurrent is generated, whereby the secondary battery module is constructed in a compact structure, design of the battery module is easily changed depending upon electrical capacity and output, and components of the battery module are stably mounted.

10 Claims, 6 Drawing Sheets

SECONDARY BATTERY MODULE WITH EXPOSED UNIT CELLS AND INSULATION BETWEEN TERMINALS

FIELD OF THE INVENTION

The present invention relates to a high-output, large-capacity secondary battery module or pack, having a plurality of unit cells electrically connected to each other, for charging and discharging electricity, and, more particularly, to a secondary battery module wherein a plurality of unit cells are stacked one on another and mounted on a plate, preferably, between an upper case and a lower case, which are separated from each other, circuit units are continuously mounted at the side surfaces of the module for sensing the voltage, the current, and the temperature of the battery, controlling the battery, and interrupting electricity when overcurrent is generated, whereby the secondary battery module is constructed in a compact structure, design of the battery module is easily changed depending upon electrical capacity and output, and components of the battery module are stably mounted.

BACKGROUND OF THE INVENTION

Recently, a secondary battery, which can be charged and discharged, has been widely used as an energy source for wireless mobile devices. Also, the secondary battery has attracted considerable attention as a power source for electric vehicles and hybrid electric vehicles, which have been developed to solve problems, such as air pollution, caused by existing gasoline and diesel vehicles using fossil fuel. As a result, kinds of applications using the secondary battery are being increased owing to advantages of the secondary battery, and hereafter the secondary battery is expected to be applied to more applications and products than now.

As kinds of applications and products, to which the secondary battery is applicable, are increased, kinds of batteries are also increased such that the batteries can provide outputs and capacities corresponding to the various applications and products. Furthermore, there is a strong need to reduce the sizes and weights of the batteries applied to the corresponding applications and products.

For example, small-sized mobile devices, such as mobile phones, personal digital assistants (PDAs), digital cameras, and laptop computers, use one or several small-sized, light cells for each device according to the reduction in size and weight of the corresponding products. On the other hand, medium- or large-sized devices, such as electric bicycles, electric motorcycles, electric vehicles, and hybrid electric vehicles, use a medium- or large-sized battery module (or medium- or large-sized battery pack) having a plurality of cells electrically connected with each other because high output and large capacity is necessary for the medium- or large-sized devices. The size and weight of the battery module is directly related to the receiving space and output of the corresponding medium- or large-sized device. For this reason, manufacturers are trying to manufacture small-sized, light battery modules. Furthermore, devices, which are subject to a large number of external impacts and vibrations, such as electric bicycles and electric vehicles, require stable electrical connection and physical connection between components constituting the battery module. In addition, a plurality of cells are used to accomplish high output and large capacity, and therefore, the safety of the battery module is regarded as important.

Generally, a medium- or large-sized battery module is manufactured by mounting a plurality of unit cells in a case (housing) having a predetermined size and electrically connecting the unit cells. Rectangular secondary cells or pouch-shaped secondary cells, which can be stacked with high integration, are used as the unit cells. Preferably, the pouch-shaped cells are normally used as the unit cells, since the pouch-shaped cells are light and inexpensive.

FIG. 1 is a typical plan view illustrating a conventional pouch-shaped cell 100. Referring to FIG. 1, the pouch-shaped cell 100 includes an electrode assembly (not shown), which comprises a cathode, a separation film, and an anode, mounted together with an electrolyte in a sealed pouch-shaped case 110, which is made of an aluminum laminate sheet. From the electrode assembly extends electrode taps, which protrude from the upper end of the cell to constitute plate-shaped electrode terminals 120 and 130. Alternatively, the plate-shaped electrode terminals 120 and 130 may be constituted by electrode leads attached to the electrode taps, which protrude from the upper end of the cell.

However, several problems are raised when manufacturing a battery module using the above-described cell as the unit cell.

Specifically, the mechanical strength of the cell sheath (case) is lower, and therefore, it is difficult to manufacture a structurally strong battery module using a plurality of such cells. Also, the cell itself does not include a structure for coupling the cells to each other, and therefore, an additional coupling member is necessary to manufacture the battery module.

In the conventional art, cells are mounted in a cartridge, which is capable of receiving one to three cells, a plurality of cartridges are stacked (piled) one on another, and the stacked cartridges are mounted in a module case to manufacture a battery module. In other words, the plurality of cartridge and the module case are used to manufacture the battery module including the plurality of cells. Consequently, the size of the battery module is increased, and a manufacturing process of the battery module is complicated.

Also, it is difficult to electrically connect the plate-shaped electrode terminals of the pouch-shaped cell in series or in parallel with each other. Consequently, a process for electrical connection between the electrode terminals is also complicated. Generally, the electrode terminals are connected with each other using wires, plates, or bus bars by welding. For this reason, the plate-shaped electrode terminals are partially bent, and the plates or the bus bars are connected to the bent parts of the plate-shaped electrode terminals by welding, which requires skilled techniques. Also, this connecting process is very complicated. In addition, the connected parts may separate from each other due to external impacts, which results in increase in the number of defective products.

Also, as there are many kinds of products using the secondary battery in medium- or large-sized device applications as previously described, various battery modules that are capable of providing corresponding electrical capacity and output are necessary. Furthermore, when the sizes of products are different even in the same product group, the corresponding electrical capacities and outputs are also different, and therefore, it is necessary to change the design of the battery module.

The conventional medium- or large-sized secondary battery module is constructed in a structure in which a plurality of unit cells are received in a case (housing) having a predetermined size, and the unit cells are electrically connected with each other. At the outer surface of the case are mounted circuit units for sensing the voltage, the current, and the temperature of the unit cells and controlling the battery. However, this structure of the battery module has several problems.

First, it is difficult to increase or decrease the size of the battery module depending upon desired electrical capacity and output. The unit cells are designed such that the unit cells are suitable for a case having a predetermined size and various components having structures corresponding to the case. Consequently, when unit cells are to be added to increase the output, for example, it is necessary to change the design of the whole battery module.

Furthermore, various components and wires, which are mounted at the outside of the case or provided for electrical connection, are not constructed in a compact structure (high density). Consequently, the size of the battery module is increased, and the battery module does not provide high safety against external impacts.

SUMMARY OF THE INVENTION

Accordingly, it is an object of the present invention to substantially obviate the above-mentioned problems of the conventional arts as well as the technical problems requested from the past.

A first object of the present invention is to provide a battery module wherein the size of the battery module can be easily increased or decreased depending upon desired electrical capacity and output, components constituting the battery module and wires for electric connection are constructed in a compact structure while the electrical connection is stably accomplished.

A second object of the present invention is to provide a battery module that is capable of providing high safety against external impacts even though a module case, which has a compact structure and relatively low strength, is used.

In accordance with the present invention, the above and other objects can be accomplished by the provision of a high-output, large-capacity secondary battery module, having a plurality of unit cells electrically connected to each other, for charging and discharging electricity, wherein the battery module comprises: a plate, on which the plurality of unit cells, which are chargeable and dischargeable secondary cells, are stacked one on another; and circuit units for controlling the operation of the battery.

The plate is not particularly restricted so long as the plate has a structure in which the unit cells can be stacked one on another. The plate may be a case having a receiving part corresponding to the size of the unit cells such that the unit cells can be easily mounted in the receiving part. Preferably, the case is constructed in a separated structure in which the upper and lower parts of the stacked unit cells are covered by separated cases, respectively.

In a preferred embodiment of the present invention, the secondary battery module comprises: a plurality of unit cells, which are chargeable and dischargeable secondary cells; a lower case on which the unit cells are sequentially stacked one on another, the lower case having an upper receiving part; an upper case for covering the upper end of the unit cells stacked on the lower case, the upper case having a lower receiving part; a first circuit unit for performing the electrical connection between the stacked unit cells, the first circuit unit including a sensing board assembly for sensing the voltage, the current and/or the temperature of the battery; a second circuit unit electrically connected to the first circuit unit, the second circuit unit including a main board assembly for controlling the battery module; and a third circuit unit electrically connected to the second circuit unit, the third circuit unit also being connected to an external output terminal while preventing overcharge, overdischarge and/or overcurrent.

The width and length of the battery module according to the present invention are slightly greater than those of unit cells, and therefore, the whole size of the battery module is very small. Consequently, the size of the battery module is minimized, and therefore, the battery module is effectively mounted at external devices and apparatuses, to which the battery module is applied.

The unit cells are not particularly restricted so long as the unit cells are chargeable and dischargeable secondary cells. For example, lithium secondary cells, nickel-metal hydride (Ni-MH) cells, or nickel-cadmium (Ni—Cd) cells may be used as the unit cells. Preferably, the lithium secondary cells are used as the unit cells, since the lithium secondary cells provide high output to weight ratio. Base on their shapes, the lithium secondary cells are classified into cylindrical cells, rectangular cells, and pouch-shaped cells. Preferably, the rectangular cells and the pouch-shaped cells, which can be stacked in high integration, are used as the unit cells. More preferably, the pouch-shaped cells, the weight of which is small, are used as the unit cells.

In a preferred embodiment of the present invention, the upper case and the lower case of the battery module are separated from each other. Consequently, when the capacity or the output of the battery module is to be changed as occasion demands, the unit cells are added or removed between the upper case and the lower case, whereby flexible design of the battery module is possible.

The whole size of the upper case and the lower case approximately corresponds to that of the unit cells. Consequently, the upper receiving part of the lower case, in which the unit cells are received, and the lower receiving part of the upper case, in which the unit cells are received, correspond to the size of the main bodies of the unit cells.

Preferably, a plate-shaped, high-strength safety member is disposed between the uppermost one of the stacked unit cells and the upper case such that the safety member is arranged in parallel with the electrode plate of the uppermost unit cell.

The mechanical safety, which is a serious problem in the compact and light-weight battery module, is related to the falling and the collision of the battery module due to external impacts or internal short circuits in the unit cells due to penetration of needle-shaped conductors. When the external impacts are applied in the direction of the electrode plates of the unit cells, the safety of the battery module is seriously deteriorated. Consequently, when the plate-shaped, high-strength safety member is disposed in the case in the direction of the electrode plates of the unit cells, the mechanical safety is greatly increased even though the weight of the battery module is only slightly increased.

The safety member is made of, preferably, a high-strength metal material, and more preferably, stainless steel. Preferably, the size of the safety member is set such that the safety member has a surface area corresponding to the unit cells and an appropriate thickness. When the thickness of the safety member is too small, it is difficult to provide desired mechanical strength. When the thickness of the safety member is too large, on the other hand, the weight of the battery module is considerably increased, which is not preferable.

In a preferred embodiment of the present invention, double-sided adhesive members are disposed between the stacked unit cells. The unit cells are more stably stacked one on another and fixed in the battery module by the double-sided adhesive members. The double-sided adhesive members may be double-sided adhesive tapes, however, the double-sided adhesive members are not limited to the double-sided adhesive tapes. For example, two or more double-sided adhesive members may be disposed on each stacking surface such that the double-sided adhesive members are spaced apart from each other. In this case, predetermined gaps are formed between the stacked unit cells by the double-sided adhesive members. The gaps between the stacked unit cells serve to absorb the change in volume of the unit cells while the unit cells are charged or discharged and, at the same time, to effectively dissipate heat generated from the unit cells.

The unit cells are stacked one on another such that the electrode terminals of the unit cells are oriented in the same direction. Preferably, each of the unit cells has plate-shaped electrode terminals, at which are formed connecting through-holes, respectively, and the upper case and the lower case are fixed to each other by fixing members, which are inserted through the connection through-holes, whereby the secure coupling between the unit cells is accomplished, and at the same time, the contact between connecting terminals for electrical connection is easily accomplished.

The plate-shaped electrode terminals are recognized to have low mechanical strength. For this reason, the plate-shaped electrode terminals are not generally used as direct coupling devices for coupling the unit cells. That is to say, as previously described, it is general that cells are mounted in a cartridge, and a plurality of cartridges are connected with each other to manufacture a battery module. In a preferred embodiment of the present invention, however, the plate-shaped electrode terminals, at which the through-holes are formed, are directly used to connect the cells.

The electrode terminals may be constructed such that the cathode terminal and the anode terminal are formed at one side of each cell, or the cathode terminal is formed at one side of each cell while the anode terminal is formed at the other side of each cell. For example, the cathode terminal and the anode terminal may be formed at the upper end and the lower end of each cell, respectively, such that the cathode terminal and the anode terminal are opposite to each other. The electrode terminals may be made of a conductive material for accomplishing electric conduction due to electrochemical reaction of the electrode assembly, such as aluminum, copper, nickel, or alloy thereof.

In a preferred embodiment of the present invention, the battery module further comprises: an insulating member mounted between the electrode terminals of the neighboring unit cells for accomplishing the electrical insulation between the electrode terminals, the insulating member having protrusions, which are fitted in the connection through-holes; and a connecting member coupled to the insulating member for electrically connecting the electrode terminals of the unit cells coupled to the insulating member in series or in parallel with each other.

In this case, the insulating member also serves to mechanically connect the electrode terminals through the protrusions. Preferably, each of the protrusions has a through-hole whose inner diameter is less than that of connecting through-holes of the electrode terminals, and the unit cells are connected with each other by stacking the unit cells while the insulating members are disposed between the unit cells and inserting fixing members through the through-holes of the protrusions.

The details of the insulating member and the connection member are described in Korean Patent Application No. 2004-112590, which has been filed in the name of the applicant of the present application. The disclosure of the application is incorporated herein by reference.

In the battery module according to the present invention, the first circuit unit includes: connecting members for connecting the unit cells in parallel or in series with each other; and the sensing board assembly for receiving and sensing voltage, current and/or temperature signals from the respective unit cells. Preferably, the first circuit unit receives the voltage and temperature signals of the unit cells. The temperature may be measured at the sensing board assembly or the main board assembly as the whole temperature of the battery. The first circuit unit is mounted at one side surface of the module adjacent to the electrode terminals of the unit cells.

The structure of the connecting members is not particularly restricted so long as the unit cells are connected in parallel or in series with each other by the connection members. Preferably, a safety member is connected between the connecting members for interrupting current when overcurrent or overheating occurs. The safety member may be a fuse, a bimetal, or a positive temperature coefficient (PTC) element.

Preferably, the sensing board assembly is a printed circuit board, which is electrically connected to the respective unit cells.

The second circuit unit may be mounted, together with the first circuit unit, at one side surface of the module adjacent to the electrode terminals of the unit cells. The second circuit unit may also be mounted in the lower receiving part of the lower case. Alternatively, second circuit unit may be mounted at the other side surface of the module such that the second circuit unit is opposite to the first circuit unit. Preferably, the second circuit unit is mounted in the lower receiving part of the lower case. In this case, the unit cells are electrically connected to the second circuit unit mounted in the lower receiving part of the lower case via the first circuit unit. The operation of the battery is controlled by the main board assembly of the second circuit unit.

The third circuit unit, which is the last element of the module connected to an external device for controlling overcharge, overdischarge and/or overcurrent while the battery is charged or discharged, may be mounted, together with the first circuit unit, at one side surface of the module adjacent to the electrode terminals of the unit cells. The third circuit unit may also be mounted in the lower receiving part of the lower case. Alternatively, the third circuit unit may be mounted at the other side surface of the module such that the third circuit unit is opposite to the first circuit unit. Preferably, the third circuit unit is mounted at the other side surface of the module such that the third circuit unit is opposite to the first circuit unit.

The circuit units may be partially or wholly constructed in a combined structure. Most preferably, the second circuit unit is mounted in the lower receiving part of the lower case, and the third circuit unit is mounted at the other side surface of the module such that the third circuit unit is opposite to the first circuit unit. In this case, the circuit units, which are used to operate the battery, are connected with each other in such a manner that the circuit units surround the battery module according to the present invention, and therefore, the whole size of the battery module is greatly reduced.

In a preferred embodiment of the present invention, the third circuit unit comprises a switching board, which includes: switching elements for controlling charge and discharge of the secondary battery module; and a heat sink structure connected to the switching elements. Preferably, the switching board is a printed circuit board (PCB) including related circuits.

The switching elements are connected in series with the unit cells constituting the battery module for controlling current flowing in the battery. The switching elements are also connected to a protection circuit for sensing the voltage and/or the current of the battery to control the switching elements. The switching elements are not particularly restricted so long as the switching elements control overcharge, overdischarge, or overcurrent. For example, field effect transistor (FET) elements or transistors may be used as the switching elements. Preferably, the FET elements are used as the switching elements.

The charge-purpose switching element is a switching element for controlling the charge state of the battery, and the discharge-purpose switching element is a switching element for controlling the discharge state of the battery. Generally, the switching elements of the battery module include the charge-purpose switching element and the discharge-purpose switching element.

The switching elements are connected to a control circuit for sensing the voltage and/or the current of the battery to control the switching elements. The switching elements are controlled on or off according to a signal output from the control circuit. Specifically, the control circuit maintains the switching elements (the charge-purpose switching element and the discharge-purpose switching element) in the on state. When an abnormal state occurs during charging of the battery, on the other hand, the charge-purpose switching element is turned off to interrupt the charge current. When an abnormal state occurs during discharge of the battery, the discharge-purpose switching element is turned off to interrupt the discharge current. Also, when the voltage of the battery exceeds a predetermined maximum voltage during charging of the battery, the control circuit outputs a signal for turning the charge-purpose switching element off to prevent overcharge of the battery. When the voltage of the battery is lowered below a predetermined minimum voltage during discharge of the battery, on the other hand, the control circuit outputs a signal for turning the discharge-purpose switching element off to prevent overdischarge of the battery. When the output side of the battery short-circuits, and therefore, overcurrent flows in the battery, or when a high charging voltage is applied to the battery due to abnormal operation of the battery, and therefore, overcurrent flows in the battery, the control circuit senses the overcurrent flowing in the battery and outputs signals for turning the switching elements off. The control circuit, which controls the switching elements, are included in the printed circuit board or an additional circuit member.

The battery module according to the present invention is preferably used in a medium- or large-sized battery system having high output and large capacity. The range of the high output and the large capacity is not particularly restricted.

For example, the battery module according to the present invention may be used as a power source for various applications and products, including a power source for vehicles, such as electric bicycles (e-bikes), electric motorcycles, electric vehicles, or hybrid electric vehicles. More preferably, the battery module according to the present invention is used as a power source for the electric bicycles, since the battery module is constructed in a compact structure.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, a preferred embodiment of the present invention will be described in detail with reference to the accompanying drawings. It should be noted, however, that the scope of the present invention is not limited by the illustrated embodiment.

Figure 1:
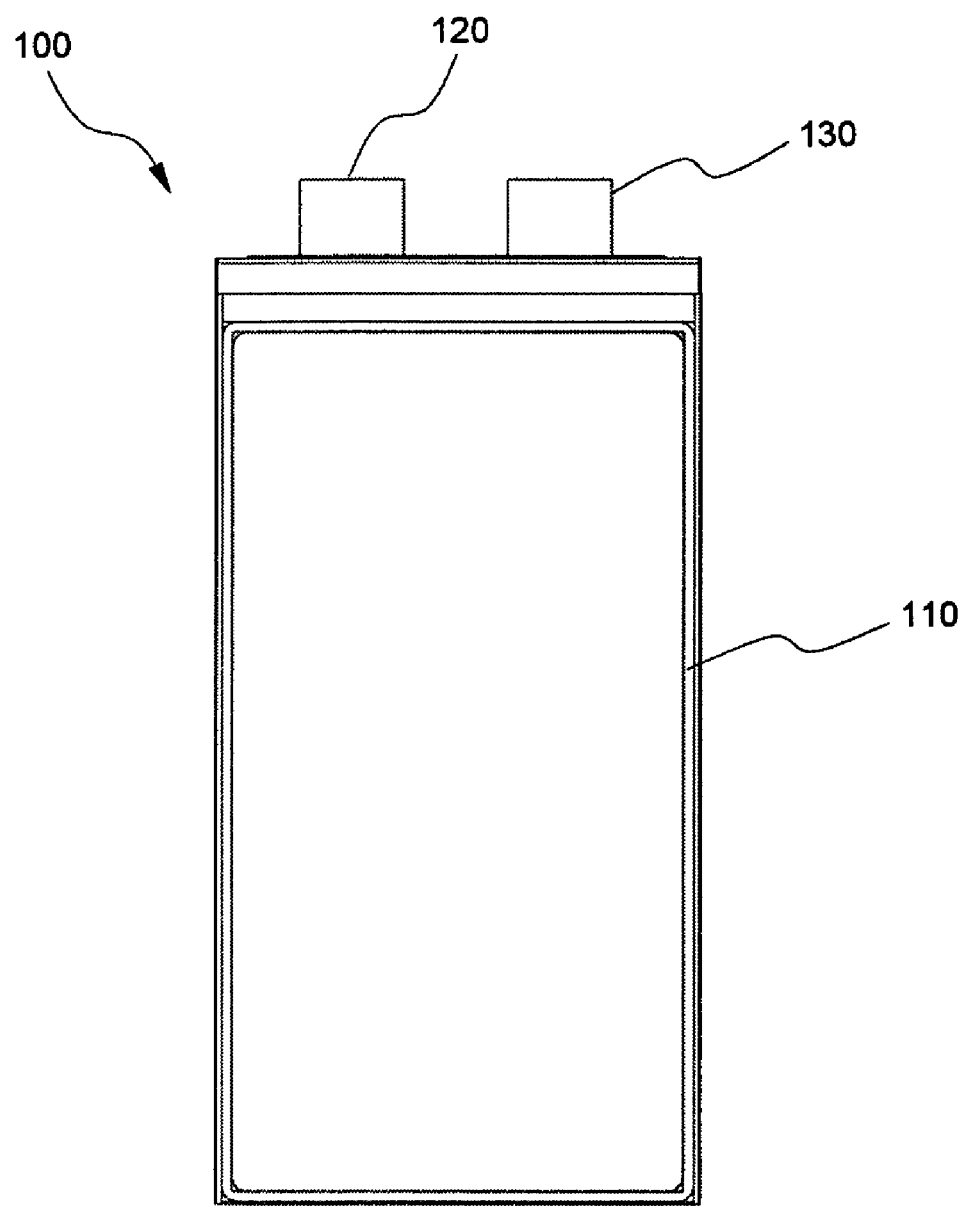
FIG. 1 is a typical plan view illustrating a conventional pouch-shaped cell.
Figure 2:
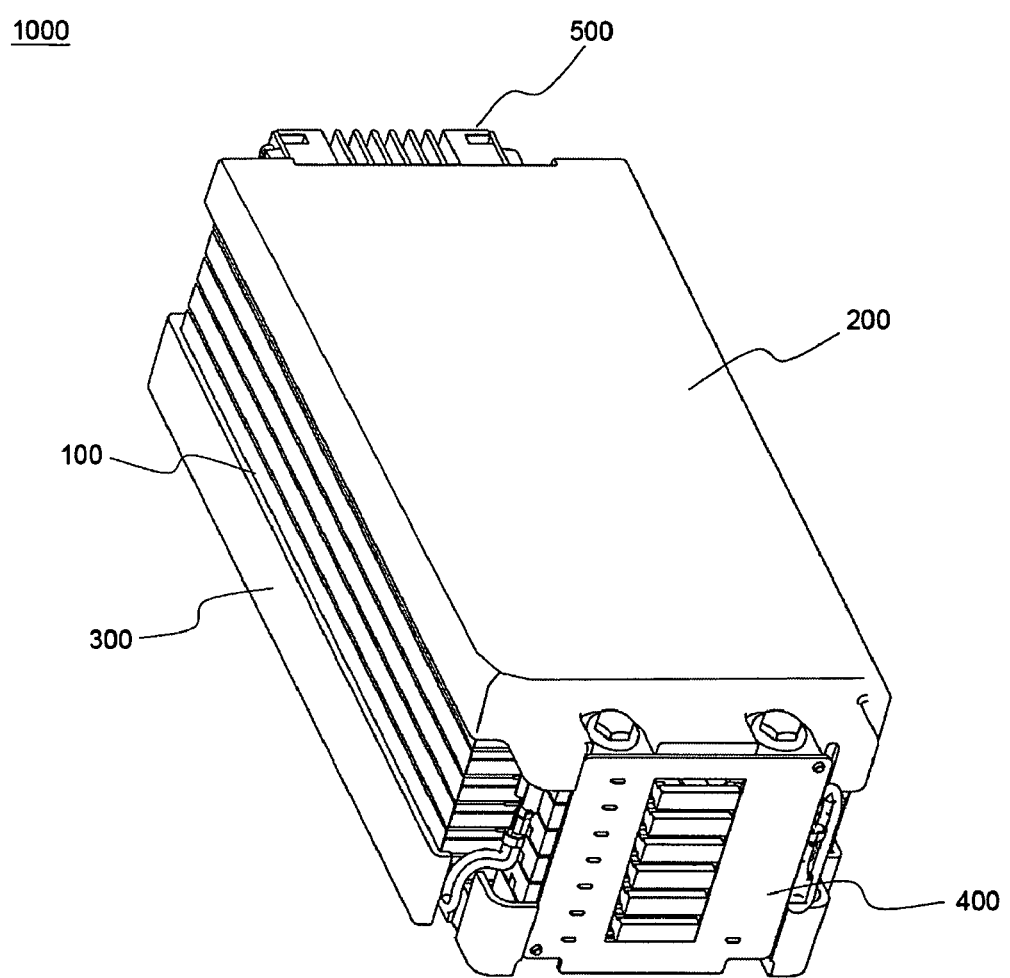
FIGS. 2 and 3 are a typical perspective view and a typical side view respectively illustrating a battery module according to a preferred embodiment of the present invention.
Figure 3:
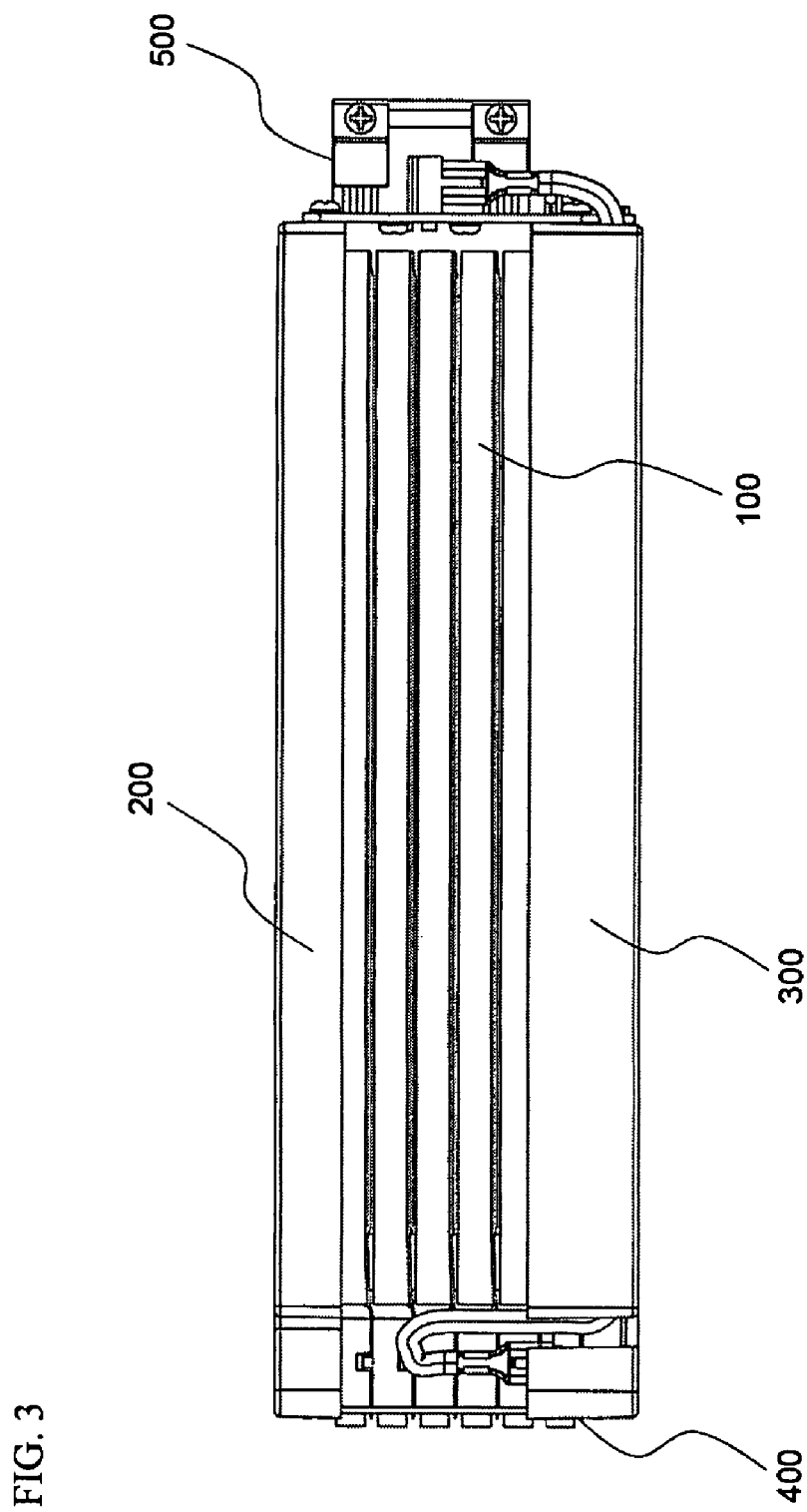

FIGS. 2 and 3 are a typical perspective view and a typical side view respectively illustrating a battery module 1000 according to a preferred embodiment of the present invention.

Referring to FIGS. 2 and 3, the battery module 1000 includes an upper case 200, a lower case 300, a plurality of unit cells 100, a first circuit unit 400, a second circuit unit (not shown), and a third circuit unit 500. The unit cells 100 are stacked between the upper case 200 and the lower case 300, which are separated from each other. The first circuit unit 400 is mounted at the front surface of the battery module 1000, the second circuit unit is mounted at the lower surface of the battery module 1000, and the third circuit unit 500 is mounted at the rear surface of the battery module 1000.

Since the upper case 200 and the lower case 300 are separated from each other, the number of the unit cells 100, which are stackable one on another, is not limited by the upper case 200 and the lower case 300. Consequently, it is possible to easily design the battery module 1000, such that the battery module 1000 has desired electrical capacity and output, by modifying the first circuit unit 400 and the third circuit unit 500 depending upon the number of the stacked unit cells 100. Also, the unit cells 100 are exposed, and therefore, heat dissipation is efficiently accomplished while the unit cells 100 are charged or discharged.

Figure 4:
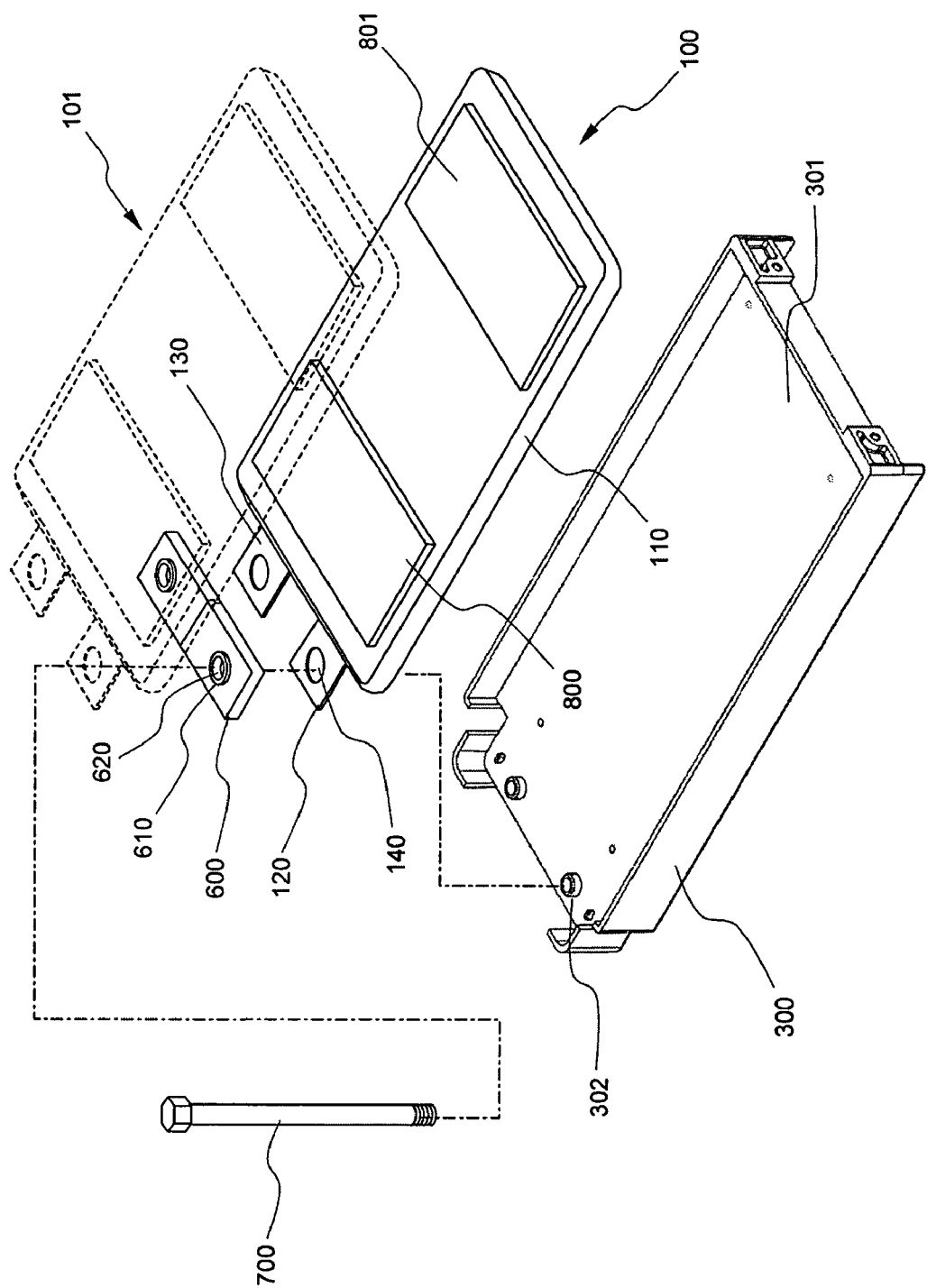
FIG. 4 is a typical view illustrating stacking of unit cells on a lower case of the battery module shown in FIG. 2.
Figure 5:
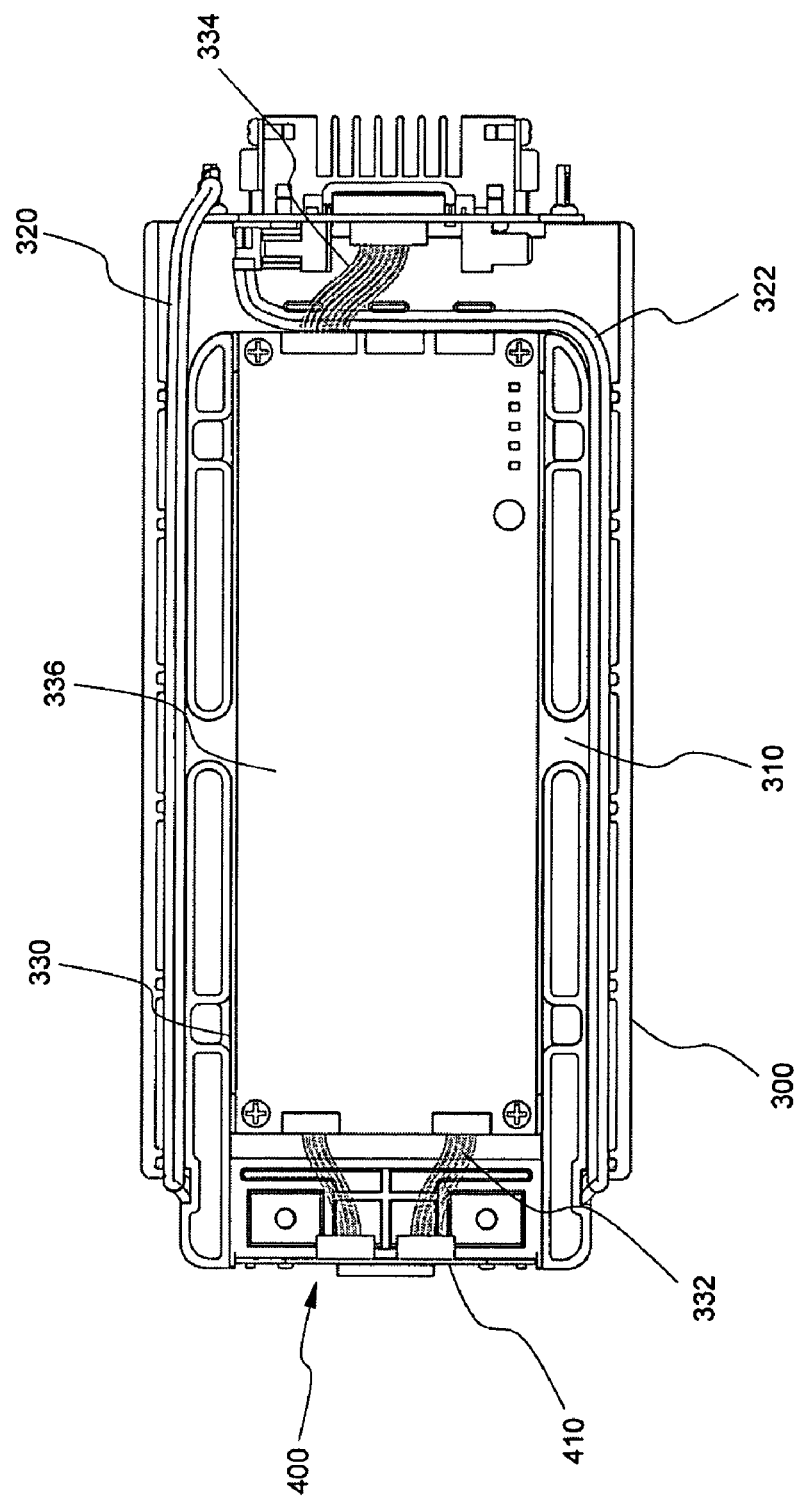
FIG. 5 is a perspective view illustrating the lower surface of the lower case of the battery module shown in FIG. 2.

FIG. 4 is a perspective view illustrating the unit cells and the lower case of the battery module shown in FIG. 2, and FIG. 5 is a perspective view illustrating the lower surface of the lower case, at which the second circuit unit is mounted.

Referring first to FIG. 4, the lower case 300 is a structural member having almost the same as the outer appearance of the unit cell 100. The lower case 300 includes an upper receiving part 301, in which the unit cell 100 is received. Preferably, the lower case 300 is made of a plastic resin, such as acrylonitrile-butadiene-styrene (ABS), polycarbonate (PC), or polybutylene terephthalate (PBT), which has high strength and electrical insulation.

The unit cell 100 stacked on the lower case 300 is a pouch-shaped secondary cell, which has a cathode terminal 120 and an anode terminal 130 protruding from the upper end of a cell body 110. At the electrode terminals 120 and 130 are formed connecting through-holes 140, respectively. Additional fixing members, for example, fasteners 700, are inserted through the connection through-holes 140 and fixing holes 302 formed in the lower case 300, while the unit cells 100 and 101 are stacked, and then nuts (not shown) are fitted on the fasteners 700 at the lower surface of the lower case 300. Consequently, the unit cells 100 and 101 are fixed to each other.

Between the electrode terminals 120 and 130 of the unit cells 100 and the electrode terminals 120 and 130 of the unit cells 101 are mounted an insulating member 600 for accomplishing the electrical insulation between the unit cells 100 and 101. At the insulating member 600 are formed protrusions 610, which are fitted in the connection through-holes 140 of the electrode terminals 120 and 130. At the protrusions 610 are also formed through-holes 620, and therefore, the electrical insulation between the fasteners 700 inserted through the through holes 620 of the protrusions 610 and the electrode terminals 120 and 130 is maintained. Although not shown in the drawings, the electrical connection between the electrode terminals may be accomplished by an additional connecting member (not shown) in the case that the insulating member 600 is included. As previously described, the details of the insulating member and the connection member are described in Korean Patent Application No. 2004-112590, which has been filed in the name of the applicant of the present application. The disclosure of the application is incorporated herein by reference.

Also, double-sided adhesive tapes 800 and 801 are attached to the cell body 110 of the unit cell 100, whereby more stable coupling between the stacked unit cells 100 and 101 is guaranteed. Furthermore, the stacked unit cells 100 and 101 are spaced apart from each other by the thickness of the double-sided adhesive tapes 800 and 801. The gap between the stacked unit cells 100 and 101 serves to absorb the change in volume of the unit cells 100 and 101 while the unit cells 100 and 101 are charged or discharged and to effectively dissipate heat generated from the unit cells 100 and 101 while the unit cells 100 and 101 are charged or discharged.

As shown in FIG. 5, the lower case 300 is provided at the lower surface thereof with a lower receiving part 310, in which the second circuit 330 is mounted. The second circuit 330 includes electric wires 320 and 322 for accomplishing electrical conduction between a cathode and an anode of a main terminal (not shown). The electric wires 320 and 322 are connected to the third circuit unit. Also, the second circuit 330 includes electric wires 332 and 334, which are electrically connected to a sensing board assembly 410 of the first circuit unit 400 and the third circuit unit, respectively.

Figure 6:
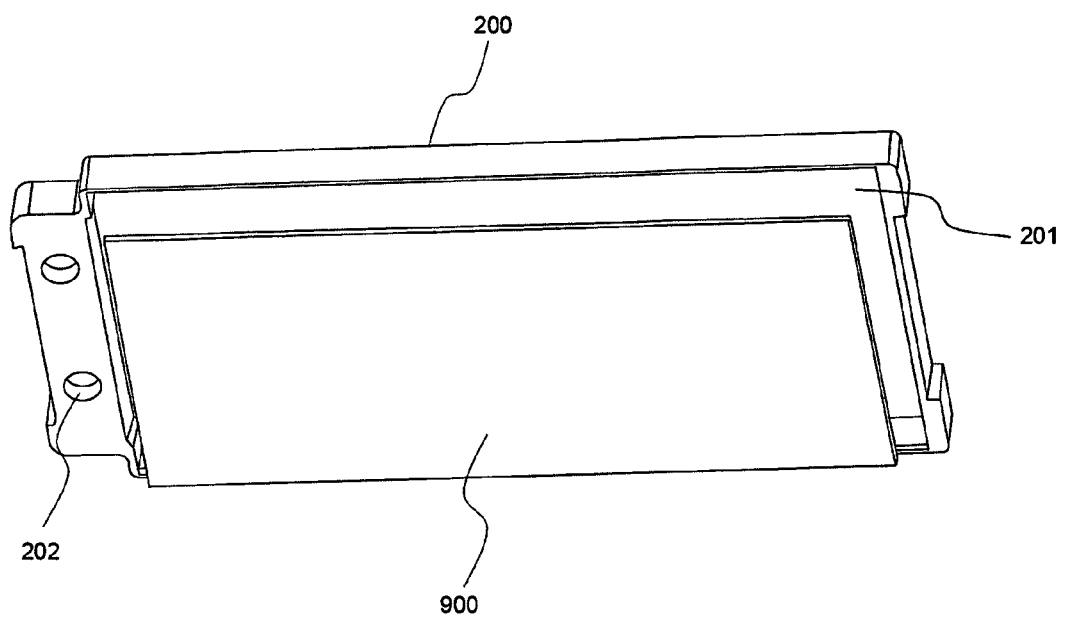
FIG. 6 is a perspective view illustrating the lower surface of an upper case of the battery module shown in FIG. 2.

FIG. 6 is a perspective view illustrating the lower surface of the upper case of the battery module shown in FIG. 2 and a safety member attached to the lower surface of the upper case.

Referring to FIG. 6, the upper case 200 may be made of the same insulating member as the lower case or another insulating member different from that of the lower case. Preferably, the upper case 200 is made of a plastic resin.

The upper case 200 has a lower receiving part 201 having a size corresponding to the unit cells 100 (see FIG. 2) such that the upper end of the uppermost unit cell 100 is received in the lower receiving part 201. Also, the upper case 200 has holes 202, which correspond to the through-holes of the electrode terminals of the unit cells.

At the lower receiving part 201 of the upper case 200 is mounted a plate-shaped safety member 900. The safety member 900 has almost the same size as the unit cells. The safety member 900 is arranged in parallel with the electrode plate of the corresponding unit cell.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the size of the secondary battery module according to the present invention can be easily increased or decreased based on desired electrical capacity and output. Also, the components constituting the battery module and the wires connecting the components of the battery module are arranged in a compact structure. Furthermore, the secondary battery module according to the present invention has high safety against external impacts. Consequently, the present invention has the effect of accomplishing stable electrical connection.

What is claimed is:

1. A high-output, large-capacity secondary battery module, having a plurality of unit cells electrically connected to each other, for charging and discharging electricity, wherein the battery module comprises:

a lower case on which the unit cells are sequentially stacked one on another, the lower case having an upper receiving part formed as part of the lower case;

an upper case for covering the upper end of the unit cells stacked on the lower case, the upper case having a lower receiving part formed as part of the upper case;

a first circuit unit for performing the electrical connection between the stacked unit cells, the first circuit unit including a sensing board assembly for sensing the voltage, the current and/or the temperature of the battery;

a second circuit unit electrically connected to the first circuit unit, the second circuit unit including a main board assembly for controlling the battery module; and a third circuit unit electrically connected to the second circuit unit, the third circuit unit also being connected to an external output terminal while preventing overcurrent, overcharge and/or overdischarge, wherein the first circuit unit is mounted at one side surface of the module adjacent to the electrode terminals of the unit cells, the second circuit unit is mounted in the lower receiving part of the lower case, and the third circuit unit is mounted at the other side surface of the module opposite to the electrode terminals of the unit cells;

wherein the structure of the battery module is such that the size of the battery module depending upon desired electrical capacity and output are increased or decreased easily;

wherein the unit cells are exposed between the lower case and the upper case such that heat dissipation can be efficiently accomplished;

wherein each of the unit cells has plate-shaped electrode terminals, at which are formed connecting through-holes, respectively, and the upper case and the lower case are fixed to each other by fixing members, which are inserted through the connection through-holes;

wherein a plate-like insulating member is mounted between the electrode terminals of the neighboring unit cells for accomplishing the electrical insulation between the electrode terminals, the insulating member having protrusions which are fitted in the connection through-holes, and a connecting member is coupled to the insulating member for electrically connecting the electrode terminals of the unit cells coupled to the insulating member in series or in parallel with each other; and wherein each of the protrusions has a through-hole whose inner diameter is less than that of connecting through-holes of the electrode terminals, the unit cells are connected with each other by stacking the unit cells while the insulating members are disposed between the unit cells and inserting fixing members through the through-holes of the protrusions; and wherein the insulating member is mounted between a cathode terminal and anode terminal of one unit cell and the cathode terminal and anode terminal of an adjacent unit cell.

2. The battery module as set forth in claim 1, wherein the secondary cells are pouch-shaped cells.

3. The battery module as set forth in claim 1, further comprising:
   double-sided adhesive members disposed between the unit cells.

4. The battery module as set forth in claim 1, further comprising:
   a plate-shaped, high-strength safety member disposed between the uppermost one of the stacked unit cells and the upper case such that the safety member is arranged in parallel with the electrode plate of the uppermost unit cell.

5. The battery module as set forth in claim 1, wherein the first circuit unit includes:
   connecting members for connecting the unit cells in parallel or in series with each other; and
   the sensing board assembly for receiving voltage and current signals from the respective unit cells and sensing the temperature of the battery.

6. The battery module as set forth in claim 5, further comprising:
   a safety member connected between the connecting members for interrupting current when overcurrent or overheating occurs.

7. The battery module as set forth in claim 1, wherein the third circuit unit includes:
   switching elements for controlling overcurrent while the battery module is charged and discharged.

8. The battery module as set forth in claim 1, wherein the third circuit unit comprises a switching board, which includes:
   switching elements for controlling charge and discharge of the battery module; and
   a heat sink structure connected to the switching elements.

9. The battery module as set forth in claim 8, wherein the switching elements are field effect transistor (FET) elements.

10. The battery module as set forth in claim 1, wherein the battery module is used as a power source for electric bicycles, electric motorcycles, electric vehicles, or hybrid electric vehicles.

* * * * *